E. I. DODDS.
NUT.
APPLICATION FILED MAR. 27, 1915.
1,229,911.
Patented June 12, 1917.
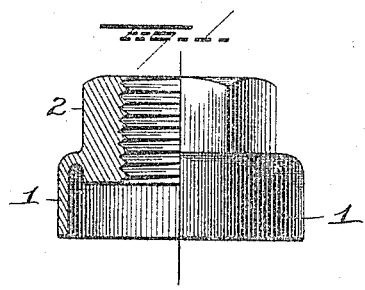
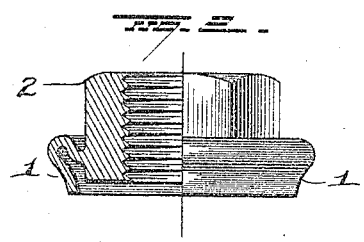
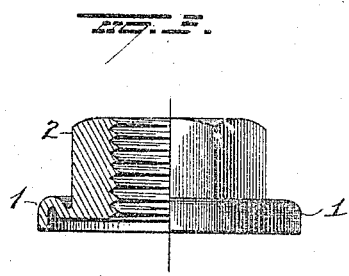
WITNESSES
INVENTOR
E. I. Dodds
Attorney

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

NUT.

1,229,911.  Specification of Letters Patent.  Patented June 12, 1917.

Application filed March 27, 1915. Serial No. 17,523.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Nuts; and I do hereby declare the following to be a full, clear, and exact description of the invention, such as will enable others skilled in the art to which it appertains to make and use the same.

My invention relates to an improvement in nuts designed for use on track and other bolts, the object being to provide a nut that will bear with a yielding pressure against the fish plate or other part through which the bolt to which the nut is secured, may pass, and lock the nut against accidental turning movement, and at the same time permit the bolt to yield or give and thus secure in effect the results that are produced by a resilient bolt.

With this end in view my invention consists in the details of construction as will be more fully described and pointed out in the claims.

In the accompanying drawings, Figure 1 is a view partly in section and partly in elevation of the blank, showing the resilient flange as originally formed and before it is bent into final shape; Fig. 2 is a similar view showing the flange bent into shape, and Fig. 3 is a similar view of modification.

In the formation of the nut, a flange 1 is formed integral with the body 2 of the nut, at or adjacent the inner end of the latter. This flange, and also the body of the nut are made of steel so that the flange, which is comparatively thin, may give or yield when in contact with a fish plate or other object, under the pressure usually applied in securing the nut to its bolt. This flange 1 if located at the inner edge of the nut as in Fig. 3, or intermediate the edges as in Fig. 2, is bent forwardly or toward the outer edge of the nut and then bent in the opposite direction and terminates in a plane beyond the inner end of the nut, so that the free edge of the flange will make contact with the fish plate or other part against which the nut bears, before the body of the nut can contact with said fish plate, and being yielding, will give or yield under the applied pressure, and thus operate to not only lock the nut in place on its bolt, but also permit the bolt to have a limited longitudinal movement, the spring flange of the nut, operating to restore the bolt to its normal position after the stress has been removed.

If the flange be located intermediate the ends of the nut as in Figs. 1 and 2 it is first formed as in Fig. 1 and then bent outwardly as in Fig. 2 so as to bring the free edge of the flange comparatively close to the inner end of the nut, and by bending the flange into loop shape as shown in Fig. 2 the necessary flexibility of flange is provided for.

The nuts thus constructed are preferably heat treated and cooled in oil so that the spring section thereof will retain its elasticity, and by increasing the length and the spring flange and also its thickness sufficient elasticity may be produced to take care of all movements and stresses to which the bolt may be subjected, and at the same time operate as a lock for the nut.

By having the flange project from a point intermediate the ends of the nut, or bent forwardly and then rearwardly so that the spring portion of the flange will be intermediate the ends of the nut, as in Fig. 3, I provide a flange of ample size to be elastic under pressure and at the same time so located as to permit the inner end of the nut to abut against the fish plate or other object, or be sufficiently close thereto to limit the movement of the bolt.

Having fully described my invention what I claim as new and desire to secure by Letters-Patent, is:—

1. As a new article of manufacture a nut having an integral spring flange intermediate its ends and projecting beyond the rear end so as to engage a fish plate or other part.

2. As a new article of manufacture, a nut having a continuous, integral peripheral spring flange intermediate its ends, the said flange projecting rearwardly beyond the inner end of the nut to engage a fish plate or other part.

3. As a new article of manufacture a nut having an integral spring flange on its peripheral surface adjacent its inner end, the said flange being bent toward the outer end of the nut and then rearwardly and terminating in a plane beyond the inner end of the nut.

In testimony whereof I have signed this specification in the presence of two subscribing witnesses.

ETHAN I. DODDS.

Witnesses:
F. H. ALLISON,
EDWIN S. RYCE.

Copies of this patent may be obtained for five cents each, by addressing the "Commissioner of Patents, Washington, D. C."